US012587016B2

(12) United States Patent
Koh

(10) Patent No.: US 12,587,016 B2
(45) Date of Patent: Mar. 24, 2026

(54) POWER SUPPLY SYSTEM, NON-TRANSITORY COMPUTER READABLE MEDIUM, AND POWER MANAGEMENT METHOD

(71) Applicant: Prime Planet Energy & Solutions, Inc., Tokyo (JP)

(72) Inventor: Hideki Koh, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 0 days.

(21) Appl. No.: 18/742,535

(22) Filed: Jun. 13, 2024

(65) Prior Publication Data

US 2024/0429714 A1     Dec. 26, 2024

(30) Foreign Application Priority Data

Jun. 20, 2023    (JP) ................................. 2023-100444

(51) Int. Cl.
| | |
|---|---|
| *H02J 3/38* | (2006.01) |
| *B60L 53/51* | (2019.01) |
| *B60L 53/62* | (2019.01) |
| *H02J 3/00* | (2006.01) |
| *H02J 7/00* | (2006.01) |
| *H02J 7/35* | (2006.01) |

(52) U.S. Cl.
CPC ................ *H02J 3/38* (2013.01); *B60L 53/51* (2019.02); *B60L 53/62* (2019.02); *H02J 3/003* (2020.01); *H02J 3/004* (2020.01); *H02J 7/0063* (2013.01); *H02J 7/35* (2013.01); *H02J 2300/24* (2020.01)

(58) Field of Classification Search
CPC .... H02J 3/38; H02J 3/003; H02J 3/004; H02J 7/0063; H02J 7/35; H02J 2300/24; B60L 53/51; B60L 53/62

USPC .......................................................... 307/24
See application file for complete search history.

(56) References Cited

U.S. PATENT DOCUMENTS

| | | |
|---|---|---|
| 11,305,667 B2 | 4/2022 | Ichikawa |
| 2011/0175576 A1 | 7/2011 | Uesaka et al. |
| 2014/0132214 A1 | 5/2014 | Katanoda |
| (Continued) | | |

FOREIGN PATENT DOCUMENTS

| | | |
|---|---|---|
| EP | 4 009 480 B1 | 5/2023 |
| JP | 10-51968 A | 2/1998 |
| JP | 2001-157369 A | 6/2001 |
| (Continued) | | |

*Primary Examiner* — Hal Kaplan
(74) *Attorney, Agent, or Firm* — Finnegan, Henderson, Farabow, Garrett, and Dunner, LLP

(57) ABSTRACT

A power supply system includes a solar light power generation device; a power storage apparatus; a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads; a first setter setting a standard power storage amount as an amount of power to be stored on the power storage apparatus, the standard power storage amount being smaller than a power storage amount thereof in a fully charged state; and a first charge/discharge controller controlling the charge/discharge device to store the power generated by the solar light power generation device on the power storage apparatus at a level of the standard power storage amount or smaller.

6 Claims, 4 Drawing Sheets

(56) References Cited

U.S. PATENT DOCUMENTS

| | | | |
|---|---|---|---|
| 2019/0160962 | A1 | 5/2019 | Ichikawa |
| 2023/0150387 | A1 | 5/2023 | Nakamura |

FOREIGN PATENT DOCUMENTS

| | | | |
|---|---|---|---|
| JP | 2009-284586 | A | 12/2009 |
| JP | 2011-160514 | A | 8/2011 |
| JP | 2012-075313 | A | 4/2012 |
| JP | 2012-085396 | A | 4/2012 |
| JP | 2014-158404 | A | 8/2014 |
| JP | 2019-097332 | A | 6/2019 |
| JP | 2020-174473 | A | 10/2020 |
| SE | 1100491 | A1 | 10/2011 |
| WO | WO 2012/172686 | A1 | 12/2012 |

POWER SUPPLY SYSTEM, NON-TRANSITORY COMPUTER READABLE MEDIUM, AND POWER MANAGEMENT METHOD

CROSS REFERENCE TO RELATED APPLICATION

This application claims the benefit of priority to Japanese Patent Application No. 2023-100444 filed on Jun. 20, 2023. The entire contents of this application are hereby incorporated by reference herein.

BACKGROUND

The present invention relates to a power supply system, a non-transitory computer readable medium storing a computer program the power supply system, and a power management method.

For example, Japanese Laid-Open Patent Publication No. 2009-284586 discloses a power system including a solar cell, a distribution board, a charge/discharge device, and a storage battery, and connected with a commercial system and home appliances. The power system described in Japanese Laid-Open Patent Publication No. 2009-284586 provides an estimate of the amount of power to be generated by the solar cell and an estimate of the amount of power to be demanded, on a time slot-by-time slot basis, based on weather information. The power system described in Japanese Laid-Open Patent Publication No. 2009-284586 plans to decrease reverse power flow to the commercial system or plans to decrease the peak value of the power to be purchased from the commercial system, based on the estimate of the amount of power to be generated by the solar cell and the estimate of the amount of power to be demanded, on a time slot-by-time slot basis.

In the case where the plan to decrease the reverse power flow to the commercial system is to be carried out, the power system described in Japanese Laid-Open Patent Publication No. 2009-284586, if possible, charges the storage battery with surplus power. In the case where the plan to decrease the peak value of the power is to be carried out, the power system described in Japanese Laid-Open Patent Publication No. 2009-284586 charges the storage battery with the power from the commercial system in an organized manner and thus decreases the peak value of the power.

SUMMARY

With the power system described in Japanese Laid-Open Patent Publication No. 2009-284586, the storage battery may possibly be kept in a fully charged state or in a state close to the fully charged state. In the case of being kept in the state close to the fully charged state, the storage battery is deteriorated progressively.

A power supply system proposed herein includes a solar light power generation device; a power storage apparatus; a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads; a first setter setting a standard power storage amount as an amount of power to be stored on the power storage apparatus, the standard power storage amount being smaller than a power storage amount thereof in a fully charged state; and a first charge/discharge controller controlling the charge/discharge device to store the power generated by the solar light power generation device on the power storage apparatus at a level of the standard power storage amount or smaller.

With the above-described power supply system, the first charge/discharge controller stores the power on the power storage apparatus at a level of the standard power storage amount or smaller. Therefore, the power storage apparatus is not left in a state close to the fully charged state. This suppresses deterioration in the power storage apparatus.

A non-transitory computer readable medium proposed herein stores a computer program configured to have a computer realize a first charge/discharge controller issuing, to a charge/discharge device connected with a solar light power generation device and a power storage apparatus and connectable with power loads, a command to store power generated by the solar light power generation device on the power storage apparatus and a command to discharge the power stored on the power storage apparatus to the power loads; and a first setter setting a standard power storage amount as an amount of power to be stored on the power storage apparatus, the standard power storage amount being smaller than a power storage amount thereof in a fully charged state. The first charge/discharge controller issues, to the charge/discharge device, a command to store the power generated by the solar light power generation device on the power storage apparatus at a level of the standard power storage amount or smaller.

A power management method proposed herein manages a power supply system including a solar light power generation device, a power storage apparatus, and a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads. The power management method proposed herein includes setting a standard power storage amount as an amount of power to be stored on the power storage apparatus, the standard power storage amount being smaller than a power storage amount thereof in a fully charged state; and storing the power generated by the solar light power generation device on the power storage apparatus, by controlling the charge/discharge device, at a level of the standard power storage amount or smaller.

The non-transitory computer readable medium storing the computer program and the power management method described above may also provide the same effects as those of the above-described power supply system.

DETAILED DESCRIPTION

Hereinafter, a preferred embodiment of a power supply system disclosed herein will be described with reference to the drawings. The embodiment described herein is not intended to specifically limit the present invention, needless to say. Unless otherwise specified, the present invention is not limited to the embodiment described herein. Elements and parts having the same functions will bear the same reference signs where appropriate, and overlapping descriptions will be omitted where appropriate.

[Configuration of the Power Supply System]

Figure 1:
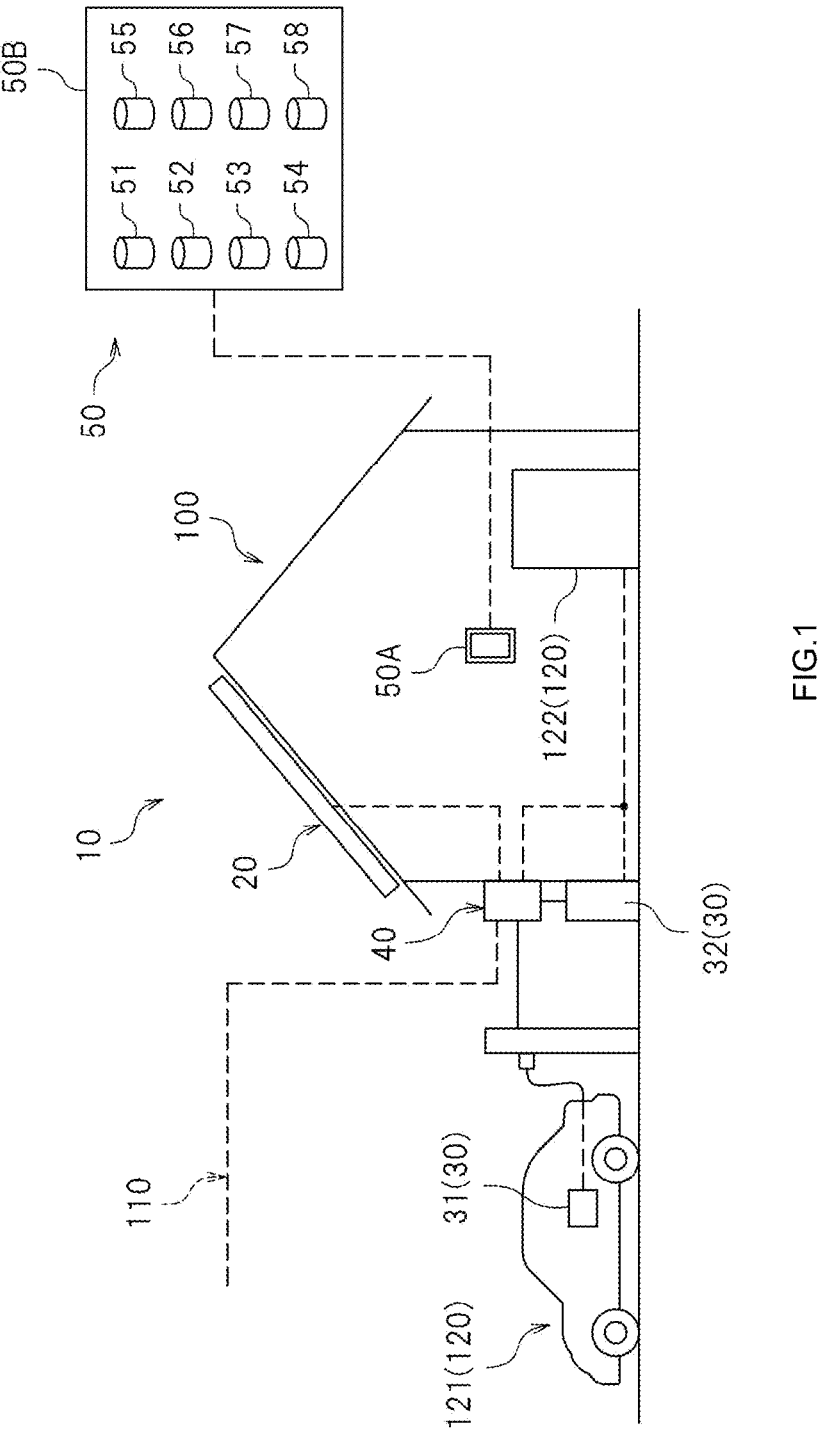
FIG. 1 is a conceptual view of a power supply system.

FIG. 1 is a conceptual view of a power supply system 10 according to a preferred embodiment. As shown in FIG. 1, the power supply system 10 according to this preferred embodiment includes a solar light power generation device 20, a plurality of power storage apparatuses 30, a charge/discharge device 40, and a controller 50. In this embodiment, the power supply system 10 supplies electric power to a home 100. It should be noted that the target to which the power supply system 10 supplies power is not limited to the home 100, and may be, for example, an office, a plant, a commercial facility, or the like. The power supply system 10 is connected with a commercial system 110 and power loads 120. In this embodiment, the power loads 120 include an electric vehicle 121 and electric appliances 122 used in the home 100.

Among the plurality of power storage apparatuses 30, one power storage apparatus 31 is a vehicle-mounted battery 31 mounted on the electric vehicle 121. The term "electric vehicle 121" may encompass vehicles, in general, driven by electric power as a source of energy, for example, an electric automobile, a hybrid electric vehicle, a plug-in hybrid electric vehicle and the like. The electric vehicle 121 may be a four-wheeled vehicle or a two-wheeled vehicle. In this embodiment, another power storage apparatus 32, among the plurality of power storage apparatuses 30, is a stationary power storage apparatus 32. There is no specific limitation on the number of the vehicle-mounted battery 31 or on the number of the stationary power storage apparatus 32. As the power storage apparatus 30, only the vehicle-mounted battery 31 or only the stationary power storage apparatus 32 may be provided. There may be only one power storage apparatus 30, instead of the plurality of power storage apparatuses 30.

In this embodiment, the solar light power generation device 20, the stationary power storage apparatus 32 and the charge/discharge device 40 are provided in the home 100. The electric vehicle 121 and the vehicle-mounted battery 31 mounted thereon are in the home 100 when the electric vehicle 121 is parked in the home 100, and move to the outside of the home 100 when the electric vehicle 121 is used. An operation terminal 50A, which is a part of the controller 50, may be in the home 100 or may be carried by a user of the power supply system 10. The operation terminal 50A may be a specialized operation terminal or may be a general terminal having an application installed thereon, for example, a smartphone or the like. In this embodiment, a server 50B, of the controller 50, connected with the operation terminal 50A is provided at a server installation site outside the home 100. Functions of the server 50B may be provided by a computer on the cloud. A part of, or the entirety of, the functions of the server 50B may be provided by a device provided in the home 100. There is no specific limitation on the site where the controller 50 is installed or on the manner of installation of the controller 50.

The power storage apparatuses 30 each include a power storage device that, upon receipt of power from the solar light power generation device 20 or the commercial system 110, stores the power thereon and releases the power to the power loads 120. The power storage apparatuses 30 each include, for example, a lithium ion secondary battery. The power storage device included in each of the power storage apparatuses 30 is not limited to the lithium ion secondary battery. The plurality of power storage apparatuses 30 may include the same type of power storage devices or different types of power storage devices.

The charge/discharge device 40 is connected with the solar light power generation device 20 and the power storage apparatuses 30. The charge/discharge device 40 is connectable with the power loads 120. The charge/discharge device 40 stores the power generated by the solar light power generation device 20 on the power storage apparatuses 30, and discharges the power stored on the power storage apparatuses 30 to the power loads 120. The charge/discharge device 40 is also connected with the commercial system 110. The charge/discharge device 40 supplies surplus power, of the power generated by the solar light power generation device 20, to the commercial system 110 by reverse power flow. In the case where the power generated by the solar light power generation device 20 is insufficient, the charge/discharge device 40 supplies the power supplied from the commercial system 110 to the power loads 120, or stores the power supplied from the commercial system 110 on the power storage apparatuses 30. The charge/discharge device 40 may be divided into a plurality of devices, for example, a device that converts the power generated by the solar light power generation device 20 into AC power and a device that converts AC power from the commercial system 110 into DC power and stores the DC power on the power storage apparatuses 30. The plurality of devices may be installed at different sites.

The controller 50 controls the charge/discharge device 40 to store the power from the solar light power generation device 20 or the commercial system 110 on the power storage apparatuses 30, to discharge the power from the solar light power generation device 20 or the commercial system 110 to the power loads 120, and to discharge the power stored on the power storage apparatuses 30 to the power loads 120. As shown in FIG. 1, the controller 50 includes a power generation amount estimator 51, a power consumption amount estimator 52, a first setter 53, a first charge/discharge controller 54, a determinator 55, a second setter 56, a second charge/discharge controller 57, and an updater 58. The controller 50 has a computer program installed thereon, the computer program being configured to have a computer realize such processors. The controller 50 controls the power supply system 10 in accordance with the computer program. The computer program may be stored in, for example, a non-transitory computer readable medium. Examples of the non-transitory computer readable medium include magnetic recording media (such as flexible disks, magnetic tapes, and hard disk drives) and CD-ROMs.

The power generation amount estimator 51 estimates the amount of power generation by the solar light power generation device 20. In more detail, the power generation amount estimator 51 acquires weather forecast information, and estimates the amount of power generation by the solar light power generation device 20 based on the acquired weather forecast information. The amount of power generation by the solar light power generation device 20 is large when the weather is fine with a large amount of solar radiation, and is small when the weather is cloudy with a small amount of solar radiation or during nighttime. In this embodiment, the power generation amount estimator 51 estimates the amount of power generation by the solar light power generation device 20 on a time slot-by-time slot basis, based on the weather forecast information on a time slot-by-time slot basis.

The power consumption amount estimator 52 estimates the amount of power consumption by the power loads 120, the power being supplied from each of the power storage apparatuses 30. Regarding the vehicle-mounted battery 31, the power consumption amount estimator 52 estimates the amount of power consumption by the electric vehicle 121 and the amount of power consumption by other power loads (in this embodiment, the electric appliances 122 in the home 100). In this manner, the power consumption amount estimator 52 estimates the amount of power consumed from the vehicle-mounted battery 31. The power consumption amount estimator 52 estimates the amount of power consumption by the electric vehicle 121 based on data on a past running distance of the electric vehicle 121. For example, the power consumption amount estimator 52 estimates the amount of power consumption by the electric vehicle 121 on a weekday based on the average value of the running distances of the electric vehicle 121 on weekdays. For example, in the case where the running distance of the electric vehicle 121 on a day off varies significantly, the power consumption amount estimator 52 assumes that the running distance of the electric vehicle 121 on a day off is a predefined distance that is longer than the average running distance on weekdays. The power consumption amount estimator 52 estimates the amount of power consumption by the electric appliances 122 based on data on past power consumption, estimated temperatures acquired from the weather forecast information, and the like.

The amount of power consumption by each of the electric vehicle 121 and the electric appliance 122 is estimated on a time slot-by-time slot basis. If there is a situation where, for example, the time to use the electric vehicle 121 is defined, or nobody is in the home 100 and the air-conditioner is not used during the daytime of a weekday, such a situation may be reflected on the estimation of the amount of power consumption. A part of the information reflected on the estimation of the amount of power consumption may be, for example, input to the operation terminal 50A by the user of the power supply system 10.

Regarding the amount of power to be stored on each of the power storage apparatuses 30, the first setter 53 sets a standard power storage amount Vs (see FIG. 2), which is smaller than a power storage amount of the power storage apparatus 30 in a fully charged state. The standard power storage amount Vs is the upper limit of the power storage amount in a normal state. In this embodiment, the standard power storage amount Vs represents a ratio (%) with respect to the power storage amount in a fully charged state, that is, so-called SOC (State of Charge). The power storage device of each power storage apparatus 30 is deteriorated progressively by a fully charged state or a state close to the fully charged state (hereinafter, also referred to simply as the "state close to the fully charged state") being continued. From the point of view of life of each power storage apparatus 30, it is desired that each power storage apparatus 30 is not put into the state close to the fully charged state. In this preferred embodiment, the standard power storage amount Vs in each of the plurality of power storage apparatuses 30 is preset in accordance with the type, the specifications and the like of the respective power storage apparatus 30.

The first charge/discharge controller 54 controls the charge/discharge device 40 to store the power generated by the solar light power generation device 20 on each power storage apparatus 30 at a level of the standard power storage amount Vs described above or smaller. In this preferred embodiment, the first charge/discharge controller 54 supplies the power loads 120 with the power generated by the solar light power generation device 20. In the case where there is surplus power in the power generated by the solar light power generation device 20, the first charge/discharge controller 54 controls the charge/discharge device 40 to store the power on each power storage apparatus 30 up to a level of the standard power storage amount Vs. When the power storage amounts in both of the power storage apparatuses 30 reach the standard power storage amount Vs, the first charge/discharge controller 54 supplies the surplus power to the commercial system 110 by the reverse power flow. In a situation where the amount of power generation by the solar light power generation device 20 is smaller than the amount of power consumption by the power loads 120, for example, during nighttime, the first charge/discharge controller 54 controls the charge/discharge device 40 to supply the power stored on the power storage apparatuses 30 to the power loads 120. In the case where it is expected that the power generation merely by the solar light power generation device 20 does not allow an amount of power, sufficient to cover the amount of power consumption by the power loads 120, to be stored on the power storage apparatuses 30, the first charge/discharge controller 54 compensates for the shortfall by the power from the commercial system 110.

The amount of power to be stored on each of the power storage apparatuses 30 under the control of the first charge/discharge controller 54 may be any amount equal to, or smaller than, the standard power storage amount Vs, and is not limited to the standard power storage amount Vs. For example, the first charge/discharge controller 54 may store, on each power storage apparatus 30, the power generated by the solar light power generation device 20 at a level of a power storage amount that is set based on the estimate of the amount of power generation provided by the power generation amount estimator 51 and the estimate of the amount of power consumption provided by the power consumption amount estimator 52 (such a set amount should not exceed the standard power storage amount Vs).

The determinator 55 determines whether or not the storage of the power on the vehicle-mounted battery 31 up to a level of the standard power storage amount Vs makes the electric vehicle 121 capable of running as expected, based on the amount of power generation estimated by the power generation amount estimator 51 and also the amount of power consumption by the electric vehicle 121 and the amount of power consumption by other power loads (in this embodiment, the electric appliances 122 in the home 100) estimated by the power consumption amount estimator 52. For example, there may be a case where even if the standard power storage amount Vs is stored on the vehicle-mounted battery 31 by the day immediately previous to the day of interest, the estimated amount of power generation of the day of interest is small or the estimated amount of power consumption of the day of interest is large, and as a result, it is estimated that a sufficient amount of power to make the electric vehicle 121 capable of running as expected will not be left in the vehicle-mounted battery 31 at the time when the electric vehicle 121 is to be used. In this case, the determinator 55 determines that the electric vehicle 121 is not capable of running as expected.

In the case where the determinator 55 determines that the electric vehicle 121 is not capable of running as expected, the second setter 56 sets a temporary power storage amount Vt (see FIG. 4), which is larger than the standard power storage amount Vs and at which the electric vehicle 121 is capable of running as expected. As a result, an inconvenience may be avoided where the electric vehicle 121 is not capable of running as expected due to the insufficiency in the amount of power with which the vehicle-mounted battery 31 is charged. In this case, the second setter 56 raises the maximum power storage amount for each of the power storage apparatuses 30 of the day immediately previous to the day of interest, from the standard power storage amount Vs to the temporary power storage amount Vt. As a result, even if the amount of power generation of the day of interest is estimated to be small, or the amount of power consumption of the day of interest is estimated to be large, a sufficient amount of power to make the electric vehicle 121 capable of running as expected will be left in the vehicle-mounted battery 31 at the time when the electric vehicle 121 is to be used. In addition, such a change in the setting decreases the number of cases where the shortfall in the power needs to be compensated for by the power from the commercial system 110 on the day of interest.

The second charge/discharge controller 57 controls the charge/discharge device 40 to store the power generated by the solar light power generation device 20 on the vehicle-mounted battery 31 up to a level of the temporary power storage amount Vt.

The updater 58 updates the standard power storage amount Vs based on a function regarding aging of the power storage apparatuses 30. When the capacitance of each power storage apparatus 30 is decreased by aging, the updater 58 increases the value of the standard power storage amount Vs in accordance with the decrease. As a result, even in a state where the power storage apparatuses 30 are deteriorated to some extent, the power supply system 10 is usable in substantially the same manner as before the deterioration. There is no specific limitation on the function regarding the aging of the power storage apparatuses 30. The function regarding the aging of the power storage apparatuses 30 may be, for example, a function representing the relationship between the total charging time and the decrease in the capacitance. The power supply system 10 may be configured to measure an index of each of the power storage apparatuses 30 (e.g., resistance), and the function regarding the aging of the power storage apparatuses 30 may be, for example, a function representing the relationship between such an index (i.e., resistance) and the decrease in the capacitance.

[Operation of the Power Supply System]

Hereinafter, an example of operation of the power supply system 10 will be described. The examples of operation are for a day on which the amount of power generation by the solar light power generation device 20 is estimated to be large (hereinafter, referred to also as a "fine day") and the day immediately previous thereto, and for a day on which the amount of power generation by the solar light power generation device 20 is estimated to be small (hereinafter, referred to also as a "cloudy day") and the day immediate previous thereto.

Figure 2:
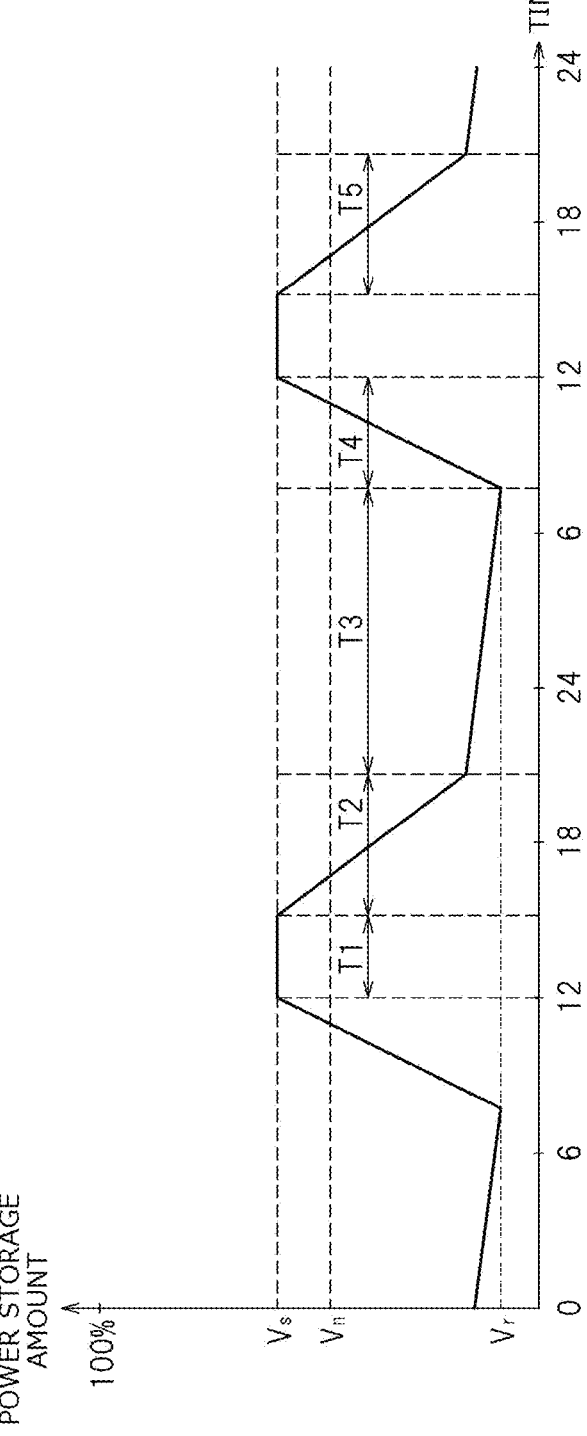
FIG. 2 is a graph showing, along time, the power storage amount in a vehicle-mounted battery on a fine day and the day immediately previous thereto.

FIG. 2 is a graph showing, along time, the power storage amount in the vehicle-mounted battery 31 of the fine day and the day immediately previous thereto. In FIG. 2, the horizontal axis represents the time (24-hour system). In FIG. 2, the vertical axis represents the power storage amount in the vehicle-mounted battery 31. In each of FIG. 3 and FIG. 4, the horizontal axis and the vertical axis represent the same.

In the case where the day of interest is estimated to be a fine day, the estimated amount of power generation by the solar light power generation device 20 is large. In this case, as shown in FIG. 2, the power storage amount in the vehicle-mounted battery 31 during the daytime (time when the power generation is possible) of the day immediately previous to the day of interest is kept at the standard power storage amount Vs (time period T1 in FIG. 2). Assuming that, for example, the electric vehicle 121 is used in the evening every day, the vehicle-mounted battery 31 is not charged during that time and the power stored on the vehicle-mounted battery 31 is consumed by the electric vehicle 121 (time period T2 in FIG. 2). In time period T3 in FIG. 2 (nighttime), the power stored on the vehicle-mounted battery 31 is consumed by the electric appliances 122 in the home 100. As a result, the power storage amount in the vehicle-mounted battery 31 is decreased.

When the power generation by the solar light power generation device 20 is started on the morning of the day of interest, the power storage amount in the vehicle-mounted battery 31 is increased gradually and reaches the standard power storage amount Vs (time period T4 in FIG. 2). As a result, a sufficient amount of power to cover the amount of power consumption by the electric appliances 122 and the amount of power consumption by the electric vehicle 121 on the day of interest is stored on the vehicle-mounted battery 31. In time period T5 in FIG. 2, the electric vehicle 121 is capable of running as expected.

Figure 3:
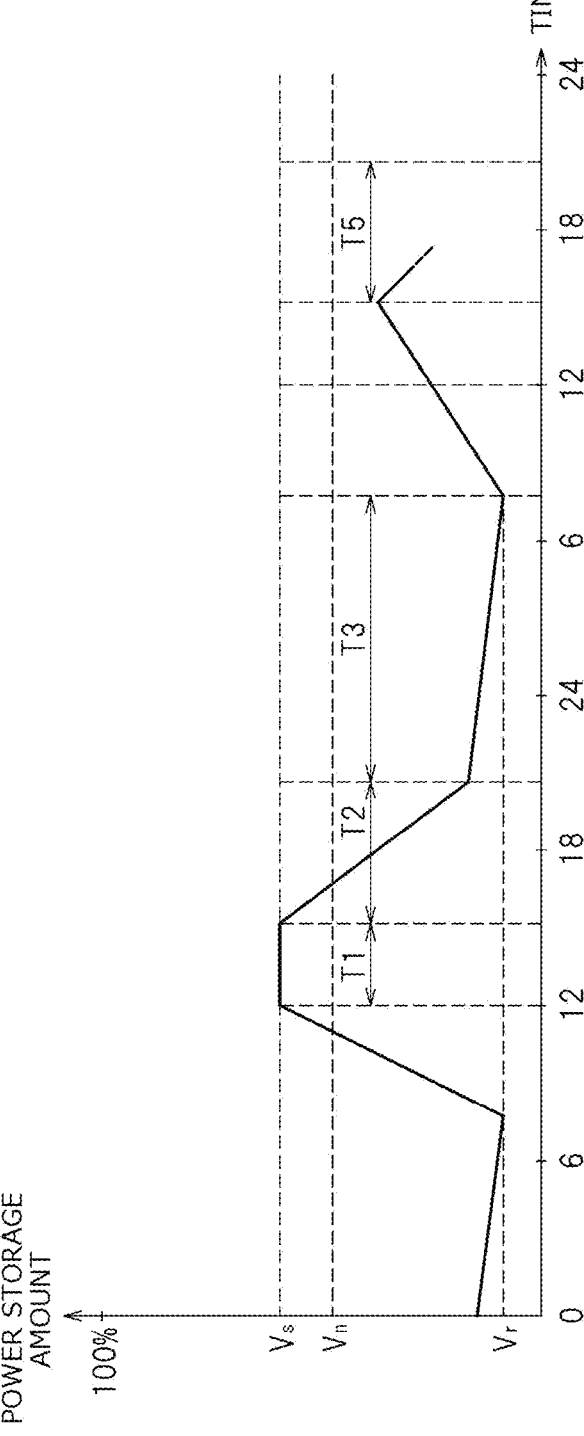
FIG. 3 is a graph showing, along time, the power storage amount in the vehicle-mounted battery in the case where the maximum power storage amount is not raised.

FIG. 3 is a graph showing, along time, the power storage amount in the vehicle-mounted battery 31 in the case where the maximum power storage amount for the vehicle-mounted battery 31 is kept at the standard power storage amount Vs, regardless of the estimate of the amount of power generation and the estimate of the amount of power consumption, although the day of interest is a cloudy day. Until the morning of the day of interest (until the end of the time period T3), the power storage amount in the vehicle-mounted battery 31 increases and decrease in substantially the same manner as in FIG. 2. As shown in FIG. 3, on such a cloudy day, the amount of power generation by the solar light power generation device 20 is small, and the power storage amount in the vehicle-mounted battery 31 increases with a low gradient. Therefore, the power storage amount in the vehicle-mounted battery 31 is not allowed to reach a power storage amount Vn, which is necessary to make the electric vehicle 121 capable of running as expected, by the start of time period T5, i.e., the time when the electric vehicle 121 is to be used. Therefore, the electric vehicle 121 is not capable of running as expected. If the power storage amount in the vehicle-mounted battery 31 is to reach the power storage amount Vn by the start of the time period T5, i.e., the time when the electric vehicle 121 is to be used, power needs to be supplied from the commercial system 110.

Figure 4:
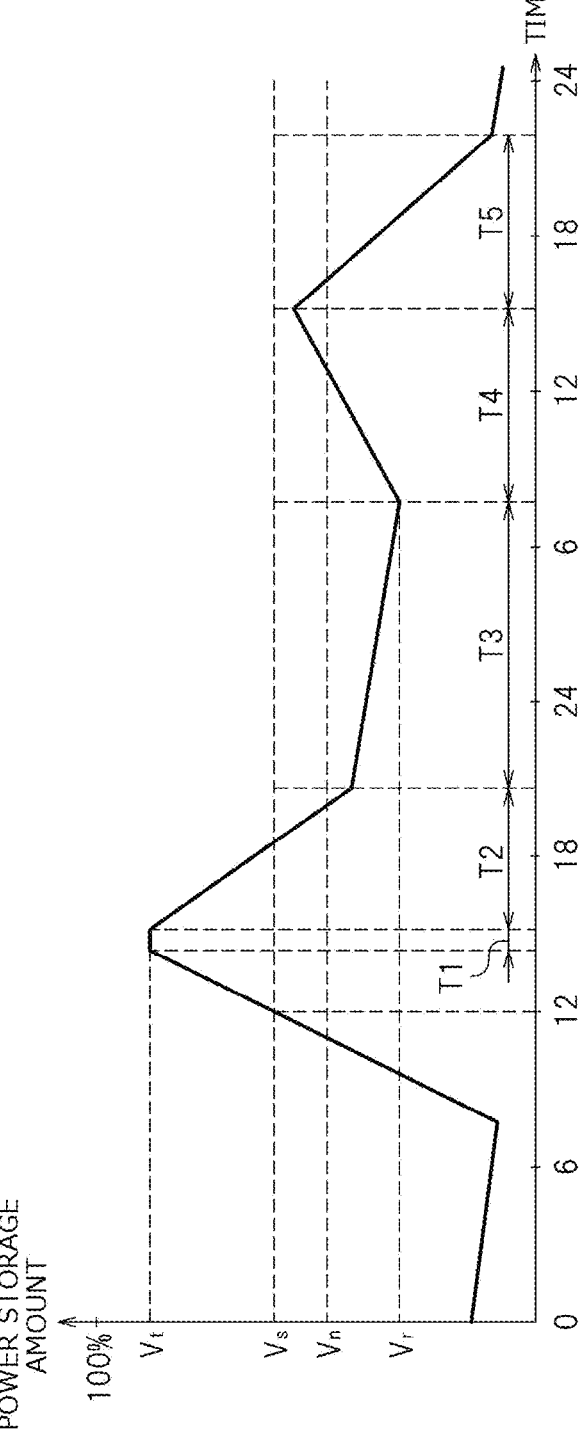
FIG. 4 is a graph showing, along time, the power storage amount in the vehicle-mounted battery on a cloudy day and the day immediately previous thereto.

FIG. 4 is a graph showing, along time, the power storage amount in the vehicle-mounted battery 31 on a cloudy day and the day immediately previous thereto. As shown in FIG. 4, in this preferred embodiment, given the information that the day of interest is a cloudy day, the maximum power storage amount for the vehicle-mounted battery 31 of the day immediately previous to the cloudy day is raised to the temporary power storage amount Vt. As a result, the power storage amount in the vehicle-mounted battery 31 during the daytime (time when the power generation is possible) of the day immediately previous to the day of interest is kept at the temporary power storage amount Vt (time period T1 in FIG. 4). The value of the temporary power storage amount Vt may change in accordance with the estimate of the amount of power generation and the estimate of the amount of power consumption. The maximum power storage amount for the vehicle-mounted battery 31 of the day immediately previous to the day of interest is raised to the temporary power storage amount Vt, so that as shown in FIG. 4, a remaining power storage amount Vr in the vehicle-mounted battery 31 at the end of the time period T3 (nighttime) is larger than in FIG. 2 and FIG. 3.

The day of interest is a cloudy day, and therefore, the power storage amount in the vehicle-mounted battery 31 increases slowly. However, the remaining power storage amount Vr in the vehicle-mounted battery 31 at the end of the time period T3 (nighttime) is large, and therefore, the power storage amount in the vehicle-mounted battery 31 is allowed to reach the power storage amount Vn, which is necessary to make the electric vehicle 121 capable of running as expected, by the start of the time period T5, i.e., the time when the electric vehicle is to be used. This makes the electric vehicle 121 capable of running as expected. In this example, no power needs to be supplied from the commercial system 110 in order to make the electric vehicle 121 capable of running as expected.

As described above, with the power supply system 10 in this preferred embodiment, the power storage amount in each power storage apparatus 30 is kept at the level of the standard power storage amount Vs or smaller as long as there is no problem regarding the running of the electric vehicle 121. This suppresses deterioration in each power storage apparatus 30. In the case where it is estimated that there is a problem regarding the running of the electric vehicle 121, the maximum power storage amount for the vehicle-mounted battery 31 is raised to the temporary power storage amount Vt. As a result, it is at least estimated that the electric vehicle 121 is capable of running as expected. In many cases among the cases where it is estimated that the electric vehicle 121 is capable of running as expected, the electric vehicle 121 actually runs as expected. The number of cases where the power from the commercial system 110 needs to be allotted in order to make the electric vehicle 121 capable of running as expected is decreased.

In the above-described example, it is assumed that the amount of power generation by the solar light power generation device 20 is decreased. The situation where the maximum power storage amount for the vehicle-mounted battery 31 needs to be raised to the temporary power storage amount Vt is not limited to such a case. For example, there may be case where the amount of power consumption is estimated to be large for the reasons that, among others, the estimated running distance of the electric vehicle 121 is long or the estimated amount of power consumption by the electric appliances 122 in the home 100 is large. In such a case also, the maximum power storage amount for the vehicle-mounted battery 31 is raised to the temporary power storage amount Vt.

Functions and Effects of the Preferred Embodiment

Hereinafter, functions and effects provided by the power supply system 10 according to this preferred embodiment will be described.

The power supply system 10 according to this preferred embodiment includes the solar light power generation device 20, the power storage apparatuses 30, and the charge/discharge device 40 connected with the solar light power generation device 20 and the power storage apparatuses 30. The charge/discharge device 40 is connectable with the power loads 120, and stores the power generated by the solar light power generation device 20 on the power storage apparatuses 30 and discharges the power stored on the power storage apparatuses 30 to the power loads 120. The power supply system 10 further includes the first setter 53 setting the standard power storage amount Vs, which is smaller than the power storage amount in the fully charged state, as an amount of power to be stored on the power storage apparatuses 30, and the first charge/discharge controller 54 controlling the charge/discharge device 40 to store the power generated by the solar light power generation device 20 on each of the power storage apparatuses 30 at a level of the standard power storage amount Vs or smaller. With the power supply system 10 having such a configuration, the first charge/discharge controller 54 stores the power on each of the power storage apparatuses 30 at a level of the standard power storage amount Vs or smaller. Therefore, the power storage apparatuses 30 are not left in a state close to the fully charged state. This suppresses deterioration in the power storage apparatuses 30.

In this preferred embodiment, at least one of the power storage apparatuses 30 is the vehicle-mounted battery 31 mounted on the electric vehicle 121. The power loads 120 include the electric vehicle 121. With such a configuration, the vehicle-mounted battery 31 on the electric vehicle 121 is utilized, so that the capacitance of the stationary power storage device 32 may be decreased.

The power supply system 10 according to this preferred embodiment further includes the power generation amount estimator 51, the power consumption amount estimator 52, the determinator 55, the second setter 56, and the second charge/discharge controller 57. The power generation amount estimator 51 estimates the amount of power generation by the solar light power generation device 20. The power consumption amount estimator 52 estimates the amount of power consumption by the electric vehicle 121 based on data on a past running distance of the electric vehicle 121 and estimates the amount of power consumption by other power loads (in this embodiment, the electric appliances 122 in the home 100) other than the electric vehicle 121, and thus estimates the amount of power to be consumed from the vehicle-mounted battery 31. The determinator 55 determines whether or not the storage of the power on the vehicle-mounted battery 31 up to a level of the standard power storage amount Vs makes the electric vehicle 121 capable of running as expected, based on the amount of power generation estimated by the power generation amount estimator 51 and the amounts of power consumption by the electric vehicle 121 and the other power loads (the electric appliances 122 in the home 100) estimated by the power consumption amount estimator 52. In the case where the determinator 55 determines that the electric vehicle 121 is not capable of running as expected, the second setter 56 sets the temporary power storage amount Vt, which is larger than the standard power storage amount Vs and at which the electric vehicle 121 is capable of running as expected. The second charge/discharge controller 57 controls the charge/discharge device 40 to store the power generated by the solar light power generation device 20 on the vehicle-mounted battery 31 up to a level of the temporary power storage amount Vt.

With such a configuration, the maximum power storage amount for the vehicle-mounted battery 31 is raised to the temporary power storage amount Vt, so that the electric vehicle 121 is made capable of running as expected. In addition, the number of cases where the power from the commercial system 110 needs to be allotted in order to make the electric vehicle 121 capable of running as expected may be decreased.

The power supply system 10 according to this preferred embodiment further includes the updater 58 updating the standard power storage amount Vs based on a function regarding aging of the power storage apparatuses 30. With such a configuration, even in a state where the power storage apparatuses 30 are deteriorated to some extent, the power supply system 10 is usable in substantially the same manner as before the deterioration.

Other Embodiments

A preferred embodiment of the power supply system 10 proposed herein is described above. The above-described preferred embodiment is merely one example, and the present invention may be carried out in other embodiments. For example, in the above-described preferred embodiment, the amount of power generation by the solar light power generation device 20 or the amount of power consumption by the power loads 120 are estimated by the power supply system 10. Alternatively, the amount of power generation by the solar light power generation device 20 or the amount of power consumption by the power loads 120 may be estimated by another system or a human. A part of the computation or the control performed by the power supply system 10 in the above-described preferred embodiment may be performed by another system or a human.

A power management method disclosed herein manages a power supply system including a solar light power generation device, a power storage apparatus, and a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads. The power management method includes the following steps: a first setting step of setting a standard power storage amount as an amount of power to be stored on the power storage apparatus, the standard power storage amount being smaller than a power storage amount in a fully charged state; and a standard power storage step of controlling the charge/discharge device to store the power generated by the solar light power generation device on the power storage apparatus at a level of the standard power storage amount or smaller. There is no specific limitation on the subject performing the above-described steps.

In the power management method disclosed herein, the power storage apparatus may be a vehicle-mounted battery mounted on an electric vehicle, and the power loads may include the electric vehicle. The method may further include a power generation amount estimation step of estimating an amount of power generation by the solar light power generation device; a power consumption amount estimation step of estimating an amount of power consumption by the electric vehicle based on data on a past running distance of the electric vehicle and estimating an amount of power consumption by other power loads other than the electric vehicle among the power loads, to estimate an amount of power to be consumed from the vehicle-mounted battery; a determination step of determining whether or not storage of the power on the vehicle-mounted battery up to a level of the standard power storage amount makes the electric vehicle capable of running as expected, based on the estimated amount of power generation and the estimated amounts of power consumption by the electric vehicle and the other power loads; a second setting step of, in the case where the electric vehicle is determined as not being capable of running as expected, setting a temporary power storage amount, which is larger than the standard power storage amount and at which the electric vehicle is capable of running as expected; and a temporary power storage step of storing the power generated by the solar light power generation device on the vehicle-mounted battery up to a level of the temporary power storage amount.

The method may further include an updating step of updating the standard power storage amount based on a function regarding aging of the power storage apparatus.

The above-described embodiments do not limit the present invention in any way unless otherwise specified. The technology disclosed herein may be altered in any of various manners. The elements and the processes referred to herein may each be omitted where appropriate, or may be combined in an appropriate manner, unless any specific problem is caused.

This specification includes the following disclosure.

Item 1

A power supply system, comprising:
a solar light power generation device;
a power storage apparatus;
a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads;
a first setter setting a standard power storage amount as an amount of power to be stored on the power storage apparatus, the standard power storage amount being smaller than a power storage amount thereof in a fully charged state; and
a first charge/discharge controller controlling the charge/discharge device to store the power generated by the solar light power generation device on the power storage apparatus at a level of the standard power storage amount or smaller.

Item 2

The power supply system according to item 1, wherein:
the power storage apparatus is a vehicle-mounted battery mounted on an electric vehicle, and
the power loads include the electric vehicle.

Item 3

The power supply system according to item 2, further comprising:
a power generation amount estimator estimating an amount of power generation by the solar light power generation device,
a power consumption amount estimator estimating an amount of power consumption by the electric vehicle based on data on a past running distance of the electric vehicle and estimating an amount of power consumption by other power loads other than the electric vehicle among the power loads, to estimate an amount of power to be consumed from the vehicle-mounted battery,
a determinator determining whether or not storage of the power on the vehicle-mounted battery up to a level of the standard power storage amount makes the electric vehicle capable of running as expected, based on the amount of power generation estimated by the power generation amount estimator and the amounts of power consumption by the electric vehicle and the other power loads estimated by the power consumption amount estimator, a second setter, in the case where the determinator determines that the electric vehicle is not capable of running as expected, setting a temporary power storage amount, which is larger than the standard power storage amount and at which the electric vehicle is capable of running as expected, and a second charge/discharge controller controlling the charge/discharge device to store the power generated by the solar light power generation device on the vehicle-mounted battery up to a level of the temporary power storage amount.

Item 4

The power supply system according to any one of items 1 through 3, further comprising an updater updating the standard power storage amount based on a function regarding aging of the power storage apparatus.

Item 5

A non-transitory computer readable medium storing a computer program configured to have a computer realize:

a first charge/discharge controller issuing, to a charge/discharge device connected with a solar light power generation device and a power storage apparatus and connectable with power loads, a command to store power generated by the solar light power generation device on the power storage apparatus and a command to discharge the power stored on the power storage apparatus to the power loads; and a first setter setting a standard power storage amount as an amount of power to be stored on the power storage apparatus, the standard power storage amount being smaller than a power storage amount thereof in a fully charged state, wherein the first charge/discharge controller issues, to the charge/discharge device, a command to store the power generated by the solar light power generation device on the power storage apparatus at a level of the standard power storage amount or smaller.

Item 6

The non-transitory computer readable medium according to Item 5, wherein the computer program is configured to have the computer realize, in the case where the power storage apparatus is a vehicle-mounted battery mounted on an electric vehicle and the power loads include the electric vehicle:

a power generation amount estimator estimating an amount of power generation by the solar light power generation device, a power consumption amount estimator estimating an amount of power consumption by the electric vehicle based on data on a past running distance of the electric vehicle and estimating an amount of power consumption by other power loads other than the electric vehicle among the power loads, to estimate an amount of power to be consumed from the vehicle-mounted battery, a determinator determining whether or not storage of the power on the vehicle-mounted battery up to a level of the standard power storage amount makes the electric vehicle capable of running as expected, based on the amount of power generation estimated by the power generation amount estimator and the amounts of power consumption by the electric vehicle and the other power loads estimated by the power consumption amount estimator, a second setter, in the case where the determinator determines that the electric vehicle is not capable of running as expected, setting a temporary power storage amount, which is larger than the standard power storage amount and at which the electric vehicle is capable of running as expected, and a second charge/discharge controller issuing, to the charge/discharge device, a command to store the power generated by the solar light power generation device on the vehicle-mounted battery up to a level of the temporary power storage amount.

Item 7

The non-transitory computer readable medium according to Item 5 or 6, wherein the computer program is configured to have the computer realize an updater updating the standard power storage amount based on a function regarding aging of the power storage apparatus.

Item 8

A power management method for managing a power supply system, the power supply system including:

a solar light power generation device, a power storage apparatus, and a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads, the power management method comprising:

setting a standard power storage amount as an amount of power to be stored on the power storage apparatus, the standard power storage amount being smaller than a power storage amount thereof in a fully charged state; and storing the power generated by the solar light power generation device on the power storage apparatus, by controlling the charge/discharge device, at a level of the standard power storage amount or smaller.

Item 9

The power management method according to item 8, wherein:

the power storage apparatus is a vehicle-mounted battery mounted on an electric vehicle, the power loads include the electric vehicle, and the power management method further includes:

estimating an amount of power generation by the solar light power generation device, estimating an amount of power to be consumed from the vehicle-mounted battery by estimating an amount of power consumption by the electric vehicle based on data on a past running distance of the electric vehicle and by estimating an amount of power consumption by other power loads other than the electric vehicle among the power loads, determining whether or not storage of the power on the vehicle-mounted battery up to a level of the standard power storage amount makes the electric vehicle capable of running as expected, based on the estimated amount of power generation and the estimated amounts of power consumption by the electric vehicle and the other power loads, setting a temporary power storage amount, in the case where the electric vehicle is determined as not being capable of running as expected, which is larger than the standard power storage amount and at which the electric vehicle is capable of running as expected, and storing the power generated by the solar light power generation device on the vehicle-mounted battery up to a level of the temporary power storage amount.

Item 10

The power management method according to item 8 or 9, further comprising updating the standard power storage amount based on a function regarding aging of the power storage apparatus.

What is claimed is:

1. A power supply system, comprising:

a solar light power generation device;

a power storage apparatus;

a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads, wherein the power storage apparatus is a vehicle-mounted battery mounted on an electric vehicle, and the power loads include the electric vehicle;

a first setter setting a standard power storage amount as an amount of power to be stored on the power storage apparatus, the standard power storage amount being smaller than a power storage amount thereof in a fully charged state;

a first charge/discharge controller controlling the charge/discharge device to store the power generated by the solar light power generation device on the power storage apparatus at a level of the standard power storage amount or smaller;

a power generation amount estimator estimating an amount of power generation by the solar light power generation device;

a power consumption amount estimator estimating an amount of power consumption by the electric vehicle based on data on a past running distance of the electric vehicle and estimating an amount of power consumption by other power loads other than the electric vehicle among the power loads, to estimate an amount of power to be consumed from the vehicle-mounted battery;

a determinator determining whether or not storage of the power on the vehicle-mounted battery up to a level of the standard power storage amount makes the electric vehicle capable of running as expected, based on the amount of power generation estimated by the power generation amount estimator and the amounts of power consumption by the electric vehicle and the other power loads estimated by the power consumption amount estimator;

a second setter, in the case where the determinator determines that the electric vehicle is not capable of running as expected, setting a temporary power storage amount, which is larger than the standard power storage amount and at which the electric vehicle is capable of running as expected; and a second charge/discharge controller controlling the charge/discharge device to store the power generated by the solar light power generation device on the vehicle-mounted battery up to a level of the temporary power storage amount.

2. A power supply system, comprising:

a solar light power generation device;

a power storage apparatus;

a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads;

a first setter setting a standard power storage amount as an amount of power to be stored on the power storage apparatus, the standard power storage amount being smaller than a power storage amount thereof in a fully charged state;

a first charge/discharge controller controlling the charge/discharge device to store the power generated by the solar light power generation device on the power storage apparatus at a level of the standard power storage amount or smaller; and an updater updating the standard power storage amount based on a function regarding aging of the power storage apparatus.

3. A non-transitory computer readable medium storing a computer program configured to have a computer realize:

a first charge/discharge controller issuing, to a charge/discharge device connected with a solar light power generation device and a power storage apparatus and connectable with power loads, a command to store power generated by the solar light power generation device on the power storage apparatus and a command to discharge the power stored on the power storage apparatus to the power loads; and a first setter setting a standard power storage amount as an amount of power to be stored on the power storage apparatus, the standard power storage amount being smaller than a power storage amount thereof in a fully charged state, wherein the first charge/discharge controller issues, to the charge/discharge device, a command to store the power generated by the solar light power generation device on the power storage apparatus at a level of the standard power storage amount or smaller, and wherein the computer program is configured to have the computer realize, in the case where the power storage apparatus is a vehicle-mounted battery mounted on an electric vehicle and the power loads include the electric vehicle:

a power generation amount estimator estimating an amount of power generation by the solar light power generation device, a power consumption amount estimator estimating an amount of power consumption by the electric vehicle based on data on a past running distance of the electric vehicle and estimating an amount of power consumption by other power loads other than the electric vehicle among the power loads, to estimate an amount of power to be consumed from the vehicle-mounted battery, a determinator determining whether or not storage of the power on the vehicle-mounted battery up to a level of the standard power storage amount makes the electric vehicle capable of running as expected, based on the amount of power generation estimated by the power generation amount estimator and the amounts of power consumption by the electric vehicle and the other power loads estimated by the power consumption amount estimator, a second setter, in the case where the determinator determines that the electric vehicle is not capable of running as expected, setting a temporary power storage amount, which is larger than the standard power storage amount and at which the electric vehicle is capable of running as expected, and a second charge/discharge controller issuing, to the charge/discharge device, a command to store the power generated by the solar light power generation device on the vehicle-mounted battery up to a level of the temporary power storage amount.

4. A non-transitory computer readable medium storing a computer program configured to have a computer realize;

a first charge/discharge controller issuing, to a charge/discharge device connected with a solar light power generation device and a power storage apparatus and connectable with power loads, a command to store power generated by the solar light power generation device on the power storage apparatus and a command to discharge the power stored on the power storage apparatus to the power loads;

a first setter setting a standard power storage amount as an amount of power to be stored on the power storage apparatus, the standard power storage amount being smaller than a power storage amount thereof in a fully charged state, wherein the first charge/discharge controller issues, to the charge/discharge device, a command to store the power generated by the solar light power generation device on the power storage apparatus at a level of the standard power storage amount or smaller; and an updater updating the standard power storage amount based on a function regarding aging of the power storage apparatus.

5. A power management method for managing a power supply system, the power supply system including:

a solar light power generation device, a power storage apparatus, and a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads, the power management method comprising:

setting a standard power storage amount as an amount of power to be stored on the power storage apparatus, the standard power storage amount being smaller than a power storage amount thereof in a fully charged state; and storing the power generated by the solar light power generation device on the power storage apparatus, by controlling the charge/discharge device, at a level of the standard power storage amount or smaller, wherein:

the power storage apparatus is a vehicle-mounted battery mounted on an electric vehicle, the power loads include the electric vehicle, and the power management method further includes:

estimating an amount of power generation by the solar light power generation device, estimating an amount of power to be consumed from the vehicle-mounted battery by estimating an amount of power consumption by the electric vehicle based on data on a past running distance of the electric vehicle and by estimating an amount of power consumption by other power loads other than the electric vehicle among the power loads, determining whether or not storage of the power on the vehicle-mounted battery up to a level of the standard power storage amount makes the electric vehicle capable of running as expected, based on the estimated amount of power generation and the estimated amounts of power consumption by the electric vehicle and the other power loads, setting a temporary power storage amount, in the case where the electric vehicle is determined as not being capable of running as expected, which is larger than the standard power storage amount and at which the electric vehicle is capable of running as expected, and storing the power generated by the solar light power generation device on the vehicle-mounted battery up to a level of the temporary power storage amount.

6. A power management method for managing a power supply system, the power supply system including:

a solar light power generation device, a power storage apparatus, and a charge/discharge device connected with the solar light power generation device and the power storage apparatus and connectable with power loads, the charge/discharge device storing power generated by the solar light power generation device on the power storage apparatus and discharging the power stored on the power storage apparatus to the power loads, the power management method comprising:

setting a standard power storage amount as an amount of power to be stored on the power storage apparatus, the standard power storage amount being smaller than a power storage amount thereof in a fully charged state;

storing the power generated by the solar light power generation device on the power storage apparatus, by controlling the charge/discharge device, at a level of the standard power storage amount or smaller; and updating the standard power storage amount based on a function regarding aging of the power storage apparatus.

* * * * *